(12) United States Patent
King et al.

(10) Patent No.: US 6,452,614 B1
(45) Date of Patent: *Sep. 17, 2002

(54) ORGANIZING A USER INTERFACE USING DIFFERENT PERSONAE

(75) Inventors: Neal J. King, Oakland; Michael Sassin, San Jose; Eli Jacobi, Palo Alto; Matthew T. Dean, Campbell, all of CA (US)

(73) Assignee: Siements Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,066

(22) Filed: Apr. 14, 1997

(51) Int. Cl.$^7$ ................................. G09G 5/00
(52) U.S. Cl. ................. 345/775; 345/778; 345/835; 345/853
(58) Field of Search ............................... 345/326–358, 345/775, 776, 777, 778, 779, 810, 835, 853, 854, 855; 707/205, 101, 102, 103, 104

(56) References Cited

U.S. PATENT DOCUMENTS

| | | | | |
|---|---|---|---|---|
| 4,885,694 A | * | 12/1989 | Pray et al. ................... | 705/400 |
| 5,235,509 A | * | 8/1993 | Mueller et al. ................ | 705/15 |
| 5,655,015 A | * | 8/1997 | Walsh et al. ................. | 379/201 |
| 5,760,771 A | * | 6/1998 | Blonder et al. .............. | 345/336 |
| 5,761,661 A | * | 6/1998 | Coussens et al. ............... | 707/9 |
| 5,799,318 A | * | 8/1998 | Cardinal et al. ............ | 707/104 |
| 5,859,639 A | * | 1/1999 | Ebrahim ..................... | 345/345 |
| 5,900,875 A | * | 5/1999 | Haitani et al. ............... | 345/840 |
| 5,918,236 A | * | 6/1999 | Wical .......................... | 707/500 |
| 5,923,845 A | * | 7/1999 | Kamiya et al. ........ | 395/200.36 |
| 6,016,478 A | * | 1/2000 | Zhang et al. ................... | 705/9 |

\* cited by examiner

Primary Examiner—Ba Huynh

(57) ABSTRACT

A user interface is organized using different personae. When in a master persona mode, a user is provided access to a full list of contacts and to a full set of data files. When in a first alternate persona mode, user access is provided to only a first subset of the full list of contacts and to only a first subset of the full set of data files.

6 Claims, 5 Drawing Sheets

ORGANIZING A USER INTERFACE USING DIFFERENT PERSONAE

BACKGROUND

1. Field of the Invention

The present invention concerns user interfaces for computers and pertains particularly to organizing a user interface using different personae.

2. Related Information

Computers have had a revolutionary impact on the way many people organize their lives. This is particularly true when the power of personal computers or terminals are enhanced through networking with other computers, such as the internet makes available. When multimedia capability is added, what was once a mere personal computing system can become a personal multimedia communications system (PMCS).

Typically, as a PMCS user begins to realize the potential uses of a PMCS, the user utilizes his PMCS for an increasing variety of tasks. A PMCS increases communication versatility for the user. A PMCS acts as a tool to assist a user in the accomplishment of many tasks. Before long, a user's PMCS generally becomes full of information files. There are various groups of people with whom the user interacts using the PMCS. In addition, different modes of communication are utilized to communicate with various other individuals.

While working on a particular task, the PMCS user has to sort through and work around information not currently needed. For example, the information not currently needed can include information files not relevant to the immediate task, or communications contact information for people not involved in the immediate task. For example, a single individual may function at different times in the role of a house buyer, a parent, a team member for a first project and a team leader for a second project. In each role, the individual will need distinct groups of information files and will need to interact with different groups of people.

In each of these roles, different communications media may be required. For example, when buying a house, still image and video may be very helpful communications media. However, still image and video may not be required when functioning as a parent and interacting with the child's school.

In current PMCS implementations, a user has to sort through all the information on his multimedia terminal to get to desired information. This can be not only burdensome but can also increase the likelihood of mistakes. These mistakes can be as simple as dialing a wrong number on a telephone or as significant as forwarding confidential information to an inappropriate destination.

Currently, information files for different roles are generally kept distinct by separating the information into different folders. Personal contact information can be placed into different directories. When a particular file needs to be used in more than one place, the file can be duplicated, or more efficiently, an "alias" of a file can be created which functions as a pointer to the original file.

However, aliases are currently not used for personal contact information. If it is desirable to divide personal contact information, any personal contact information which is to be accessed in more than one place needs to be duplicated. Alternatively, all personal contact information can be stored together at a single location. In general, there is no convenient method for separating both data files and contact information.

SUMMARY OF THE INVENTION

In accordance with the preferred embodiment of the present invention, a user interface is organized using different personae. When in a master persona mode, a user is provided access to a full list of contacts and to a full set of data files. When in a first alternate persona mode, user access is limited to only a first subset of the full list of contacts and to only a first subset of the full set of data files.

The present invention enables a user to concentrate on the task at hand. Using an alternate persona mode simplifies the task of accessing information files which pertain to a particular task or role, and simplifies the task of contacting individuals who are appropriate to the particular role. This allows a user to make very efficient use of multimedia information without being overwhelmed.

DESCRIPTION OF THE PREFERRED EMBODIMENT

Figure 1:
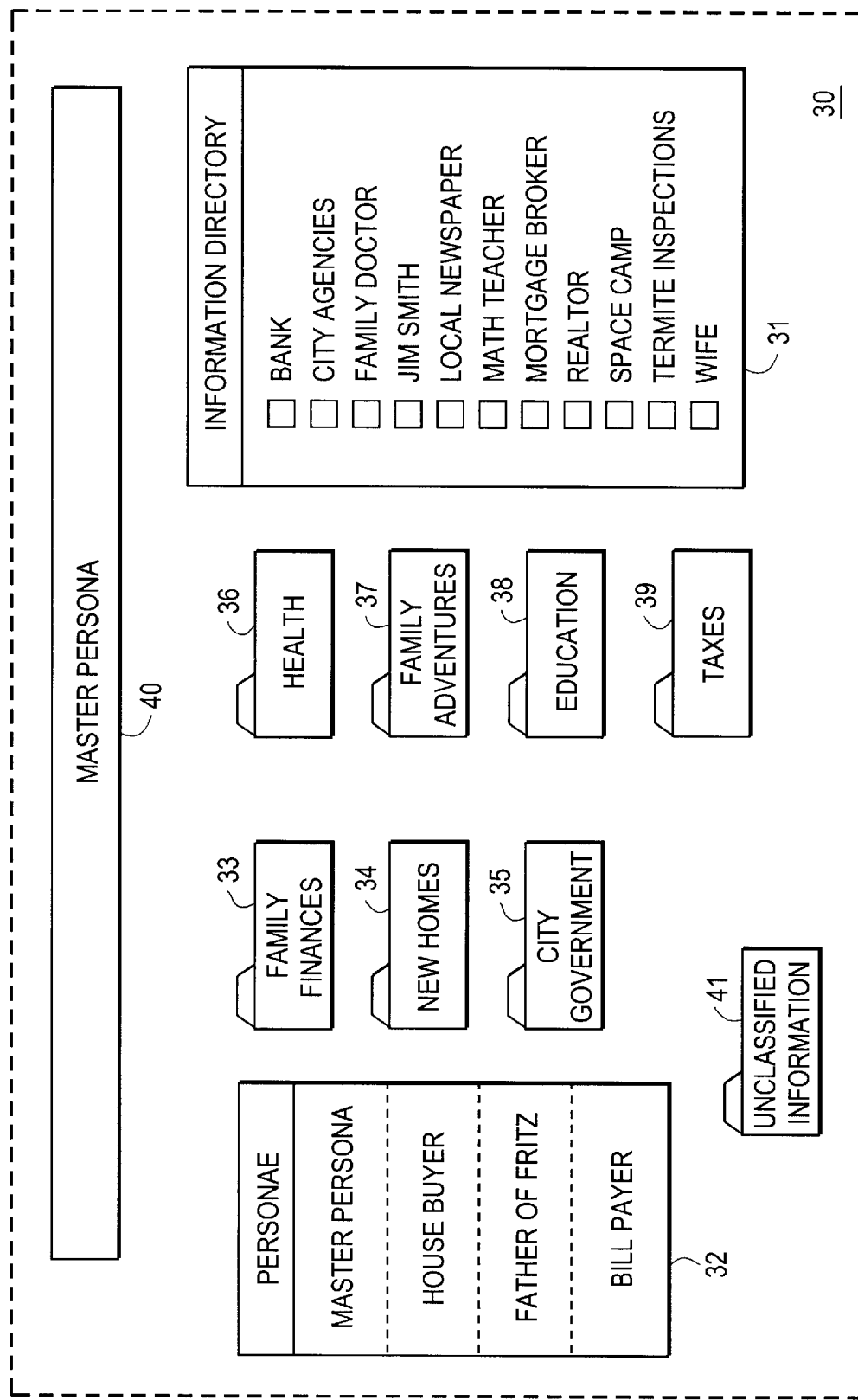
FIG. 1 is a simplified display on a terminal of information pertaining to a master persona in accordance with a preferred embodiment of the present invention.

FIG. 1 shows a window display on a personal multimedia communications system (PMCS) 30. PMCS 30 is a multimedia terminal that has multimedia communication capability, information storage capability, and information processing capability. For example, PMCS 30 is an enhanced personal computer.

Within the window display of PMCS 30, a label 40 indicates that the current persona is the master persona. A persona is a PMCS mode. The PMCS mode defines the current mode of operation of the PMCS. The selected persona depends upon the particular role the user has taken on. A role is the user's purpose, project, or case. The terms "persona" and "personae" cover various general roles that the user plays as well as specific tasks associated with those roles.

For each persona (or PMCS mode), particular information files and communications partners are accessible. For the master persona, all files are accessible and all contacts are listed. An alternate persona is associated with a structured collection of pointers to information files and pointers to contact information of specific utility to a user's project or activity.

When a particular alternate persona is active, for example, a PMCS may reject incoming communications not part of the alternate persona, or divert the incoming communications to messaging. For example, the party is identified by voice print or automatic number identification (ANI). Using ANI, the calling party could be identified by phone number and accepted, rejected, or diverted on the basis of phone number. If the caller was not recognized using ANI and diverted to a message system, the caller's voice might be recognized using a voice print mechanism within the messaging system. Such voice recognition could identify the caller as an individual who is recognized by the alternate persona, and thus allow connection to the alternate persona.

Alternatively, in another mode, if a particular alternate persona is active, the reception of incoming communications from an individual who is not recognized by the particular active alternate persona can result in switching to a different alternate persona which is able to accept the incoming communication.

FIG. 1 shows an example of how a user has arranged files for the master persona. The user has created a number of folders for organizing files. A folder 33 contains files pertaining to family finances. A folder 34 contains files which pertain to potential new homes for the user. A folder 35 contains files pertaining to the city government. A folder 36 contains files 30 pertaining to family health issues. A folder 37 contains files pertaining to family adventures, such as family vacations and family recreation. A folder 38 contains files pertaining to education. A folder 39 contains files pertaining to tax matters.

A folder 41 contains unclassified information. The unclassified information in folder 41 is, for example, for new files created in an alternate persona which have not yet been filed into a location within the master persona.

In general, data files each have a place within the master persona. A data file will have a place within an alternate persona if it is specifically placed or copied into the alternate persona. If a data file is created within an alternate persona, the data file can inherit its location from where the data file was created. However, this does not automatically give the data file a natural location within the master persona or within other alternate personae. So, in the master persona the file is, for example, placed in unclassified folder 41. A user can later re-place the data file within the master persona. A new data file created in one alternate persona is initially only available to other alternate personae through the master persona, until the new data file is specifically placed within those particular alternate personae. Further, for example, a data file can be created within an alternate persona, and then specifically saved within a position in the master persona. This will create a position for the data file within the master persona.

An information directory 31 contains contact information stored by the user. For example, information directory 31 contains a voice telephone number for the user's bank. For city agencies, information directory 31 contains telephone numbers for voice and fax and an electronic mail address. For the family doctor, information directory 31 contains a voice and a fax telephone number. For Jim Smith, who is the best friend of the user's son, Fritz, information directory 31 contains a voice telephone number. For the local newspaper, information directory 31 contains a URL address. For Fritz's math teacher, information directory 31 contains a voice telephone number. For the user's mortgage broker, information directory 31 contains telephone numbers for voice and fax and an electronic mail address. For the user's realtor, information directory 31 contains telephone numbers for voice, pager, fax, modem, and video and an electronic mail address. For Fritz's space camp, information directory 31 contains telephone numbers for voice and fax and a URL address. For the user's termite inspection agency, information directory 31 contains a voice telephone number. For the user's wife, information directory 45 contains a voice telephone number.

Within the master persona, the user is allowed to access all communications capabilities available to PMCS 30. For example, the communications capabilities include communication channels over a telephone network for voice, fax, pager, modem (or other data communications device), and video. In addition, the communications capabilities include a communication channel for electronic mail.

A persona menu 32 provides one way the user can move from the master persona to an alternate persona, from an alternate persona back to the master persona, or between alternate personae. Shown listed in persona menu 32 is the master persona, a house buyer persona, a "Father of Fritz" persona and a bill payer persona. By selecting a listed persona from persona menu 32, the user can quickly bring up the selected persona.

For example, if the user selects the house buyer persona from persona menu 32, a house buyer persona appears within a window display of PMCS 30. This is illustrated in FIG. 2, discussed below.

Additionally, persona menu 32 may be used to place files within each of the different alternate personae. For example, a file to be placed in the house buyer persona can be "selected" and "dropped" on the area listed "HOUSE BUYER" within persona menu 32. This will result in the file being placed within the house buyer persona, in an unclassified folder within the house buyer persona.

Instead of, or in addition to, using persona menu 32, each persona may be represented by an icon. In this case, by selecting an icon for an alternate persona, the user can quickly bring up that alternate persona. For example, if the user selects a house buyer persona icon, the house buyer persona will appear within a window display of PMCS 30. Additionally, the icons may be used to place files within each of the different alternate personae. For example a file to be placed in the house buyer persona can be "selected" and "dropped" on the house buyer icon. This will result in the file being placed within the house buyer persona.

Figure 2:
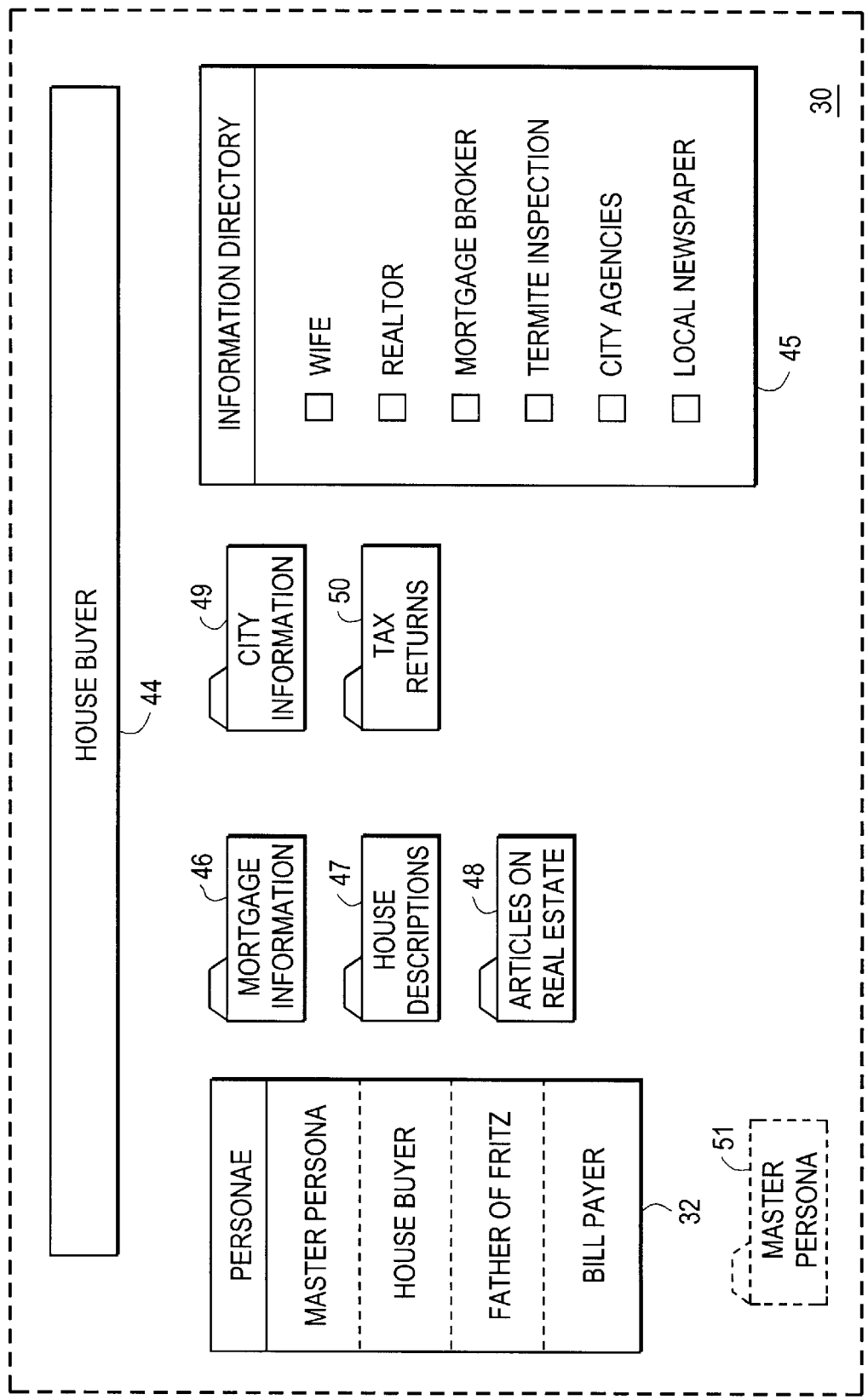
FIG. 2 is a simplified display on a terminal of information pertaining to a first alternate persona in accordance with a preferred embodiment of the present invention.

FIG. 2 shows an example of how a user has selected and arranged files for the house buyer persona. Within the window display of PMCS 30, a label 44 indicates that the current persona is the house buyer persona.

The house buyer persona is an alternate persona. Alternate personae contain files from the master persona; however, the files are typically organized differently. Additionally, communications capabilities may be limited in an alternate persona. Also, the people whom it is possible to contact from an alternate persona may be fewer than the full group of people that may be contacted from within the master persona. The house buyer persona contains a subset of files from the master persona. The subset of files in the house buyer persona is arranged differently than the full set of files in the master persona. This is clear also from the house buyer persona shown in FIG. 2.

For example, as shown in FIG. 2, a mortgage information folder 46 includes one or more pointers to files pertaining to mortgage information. For example, this could be a subset of the files filed in new homes folder 34 within the master persona. A house descriptions folder 47 includes one or more pointers to files pertaining to descriptions of new houses. For example, this could be a subset of the files filed in new homes folder 34 within the master persona. An "articles on real estate" folder 48 includes one or more pointers to files containing articles pertaining to real estate. For example, this could be a subset of the files filed in new homes folder 34 and in education folder 38 within the master persona. A city information folder 49 includes one or more pointers to files containing information pertaining to the city and particularly to city information regarding housing. For example, this could be a subset of the files filed in new homes folder 34 and the files filed in city government file 35 within the master persona. Tax returns folder 50 includes one or more pointers to files pertaining to tax returns. For example, this could be a subset of the files filed in taxes folder 39 within the master persona. The folders are implemented, for example, by including pointers or aliases to actual files arranged within the master persona.

Any file, pointed to by a mortgage information folder 46, house descriptions folder 47, "articles on real estate" folder 48, city information folder 49 or tax returns folder 50, which was newly created by an alternate persona may also reside within unclassified information folder 41 of the master persona until the user places it in a desired location within the master persona.

An information directory 45 contains contact information available to the house buyer persona. The contact information directory 45 is a subset of contact information directory 31 within the master persona. The contact information in information directory 45 is not necessarily listed in the same order as the contact information is listed within information directory 31 of the master persona.

For example, information directory 45 contains a voice telephone number for the user's wife. For the user's realtor, information directory 45 contains telephone numbers for voice, pager, fax, modem, and video, and an electronic mail address. For the user's mortgage broker, information directory 45 contains telephone numbers for voice and fax and an electronic mail address. For the user's termite inspection company, information directory 45 contains a voice telephone number. For city agencies, information directory 45 contains telephone numbers for voice and fax and an electronic mail address. For the local newspaper, information directory 45 contains a URL address.

Within the home buyer persona, the user is allowed, for example, to access communication channels over a telephone network for voice, fax, modem, and video. In addition, within the home buyer persona, the user is allowed to access a communication channel for electronic mail. Table 1 below shows an example of a simplified data structure which describes the house buyer persona illustrated by FIG. 2:

TABLE 1

NAME OF ROLE: "House Buyer"

FOLDERS OF INFORMATION FILES:

"Mortgage Information"
"House Descriptions"
"Articles on Real Estate"
"City Information"
"Tax Returns"

CONTACT INFORMATION:

"Wife": voice
"Realtor": voice, fax, pager, modem, video; e-mail
"Mortgage Broker": voice, fax; e-mail
"Termite Inspection": voice, fax, pager, modem, video; e-mail
"City Agencies": voice, fax; e-mail
"Local Newspaper": URL TABLE 1-continued NAME OF ROLE: "House Buyer"

COMMUNICATIONS INVOCATION CAPABILITIES:

Voice
Fax
Pager
Modem
Video
E-mail

A master persona folder 51 provides one way the user can access files within the master persona without leaving the house buyer persona. This folder is half hidden to indicate that this folder contains pointers to files some of which are not within the current alternate persona. Persona menu 32 appears within each alternate persona and provides one way the user can move back to the master persona or to another alternate persona.

If the user selects the "Father of Fritz" persona from persona menu 32 (shown in FIG. 1) or if in some other way the "Father of Fritz" persona is selected, a "Father of Fritz" persona appears within a window display of PMCS 30. This is illustrated in FIG. 3.

Figure 3:
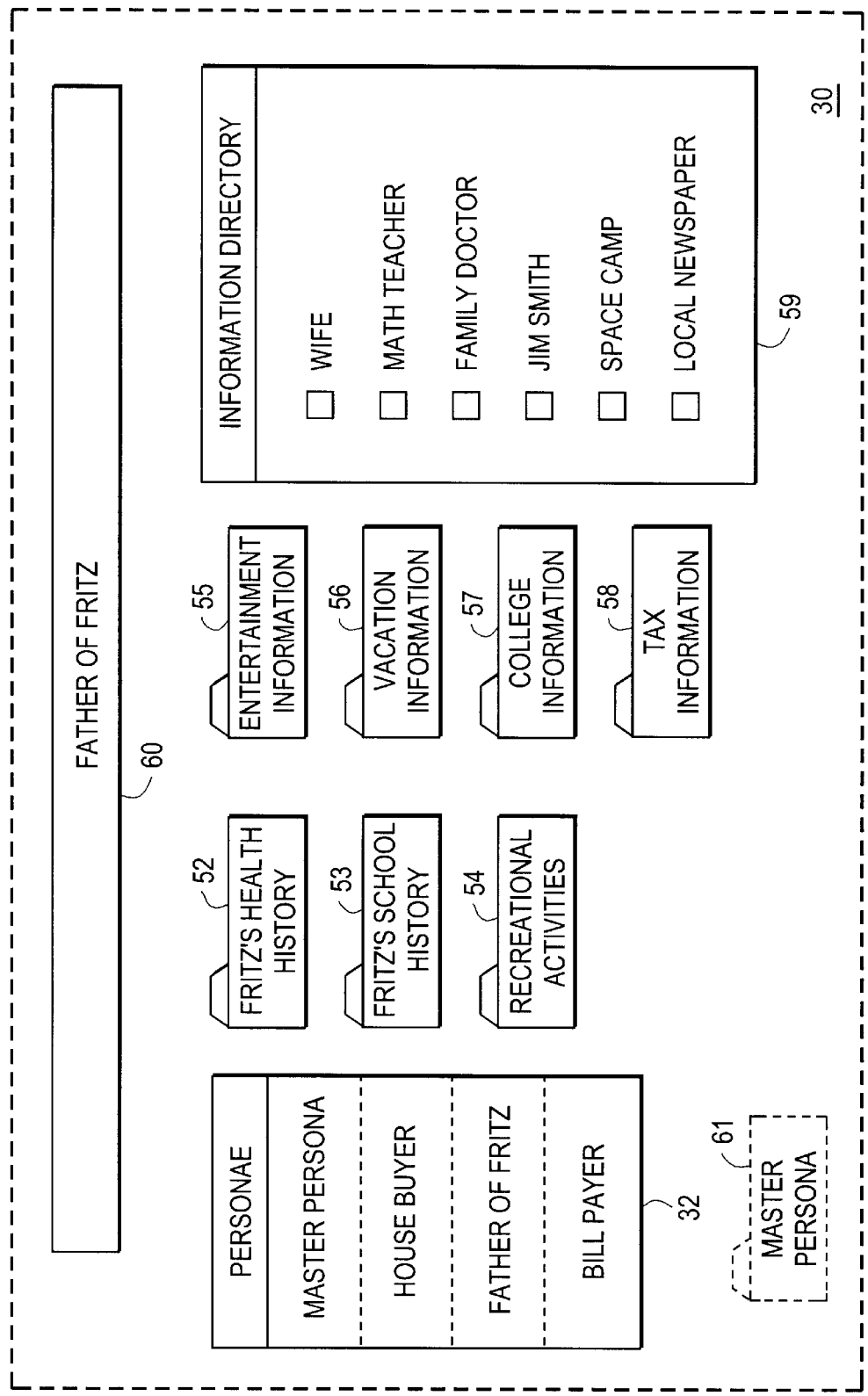
FIG. 3 is a simplified display on a terminal of information pertaining to a second alternate persona in accordance with a preferred embodiment of the present invention.

FIG. 3 shows an example of how a user has selected and arranged files for the "Father of Fritz" persona. Within the window display of PMCS 30, a label 60 indicates that the current persona is the "Father of Fritz" persona.

The "Father of Fritz" persona contains a subset of files from the master persona. The subset of files in the "Father of Fritz" persona is arranged differently than the full set of files in the master persona. This is clear also from the "Father of Fritz" persona shown in FIG. 3.

For example, as shown in FIG. 3 a "Fritz's health history" folder 52 includes one or more pointers to files pertaining to Fritz's health. For example, this could be a subset of the files filed in health folder 36 within the master persona. A "Fritz's school history" folder 53 includes one or more pointers to files pertaining to Fritz's education. For example, this could be a subset of the files filed in education folder 38 within the master persona. A "recreational activities" folder 54 includes one or more pointers to files containing information about Fritz's recreation. For example, this could be a subset of the files filed in "family adventures" folder 37 within the master persona. An "entertainment" folder 55 includes one or more pointers to files containing information about family entertainment. For example, this could be a subset of the files filed in family adventures folder 37 within the master persona. A vacation information folder 56 includes one or more pointers to files containing information pertaining to family vacations. For example, this could be a subset of the files filed in family adventures folder 37 and the files filed in education folder 38 within the master persona. A college information folder 57 includes one or more pointers to files containing information regarding Fritz's college education. For example, this could be a subset of the files filed in family finances folder 33 and the files filed in education folder 38 within the master persona. Tax information folder 58 includes one or more pointers to files pertaining to tax returns. For example, this could be a subset of the files filed in taxes folder 39 and/or a subset of the files within family finances folder 33 within the master persona.

An information directory 59 contains contact information available to the "Father of Fritz" persona. The contact information directory 59 is a subset of contact information directory 31 within the master persona. The contact information in information directory 59 is not necessarily listed in the same order as the contact information within information directory 31 of the master persona.

For example, information directory 59 contains a voice telephone number for the user's wife. For Fritz's math teacher, information directory 59 contains a voice telephone number. For the family doctor, information directory 59 contains a voice and a fax telephone number. For Jim Smith, who is the best friend of the users son, Fritz, information directory 59 contains a voice telephone number. For Fritz's space camp, information directory 59 contains telephone numbers for voice and fax and a URL address. For the local newspaper, information directory 59 contains a URL address.

Within the "Father of Fritz" persona, the user is allowed, for example, to access communication channels over a telephone network for voice, fax and modem. In addition, within the "Father of Fritz" persona, the user is allowed to access a communication channel for electronic mail.

Table 2 below shows an example of a simplified data structure which describes the "Father of Fritz" persona illustrated by FIG. 3:

TABLE 2

NAME OF ROLE: "Father of Fritz"

FOLDERS OF INFORMATION FILES:

"Fritz's Health History"
"Fritz's School History"
"Recreational Activities"
"Entertainment Information"
"Vacation Information"
"College Information"
"Tax Information"

CONTACT INFORMATION:

"Wife": voice
"Math Teacher": voice
"Family Doctor": voice, fax
"Jim Smith": voice
"Space Camp": voice, fax; URL
"Local Newspaper": URL

COMMUNICATIONS INVOCATION CAPABILITIES:

Voice
Fax
Modem
E-mail

A master persona folder 61 provides one way the user can access files within the master persona without leaving the "Father of Fritz" persona. This folder is half hidden to indicate that this folder contains pointers to files not all of which are within the current alternate persona.

Persona menu 32 appears within each alternate persona and provides one way the user can move back to the master persona or to another alternate persona.

As is clear from comparing the "Father of Fritz" persona with the "house buyer" persona, some information files and some contact information can be in more than one alternate persona. Other information files and contact information may appear in only one alternate persona.

While FIG. 1 shows a persona menu 32 which provides one way the user can move between personae, there are several other events which can be used to trigger a move to an alternate persona or to the master persona.

Figure 4:
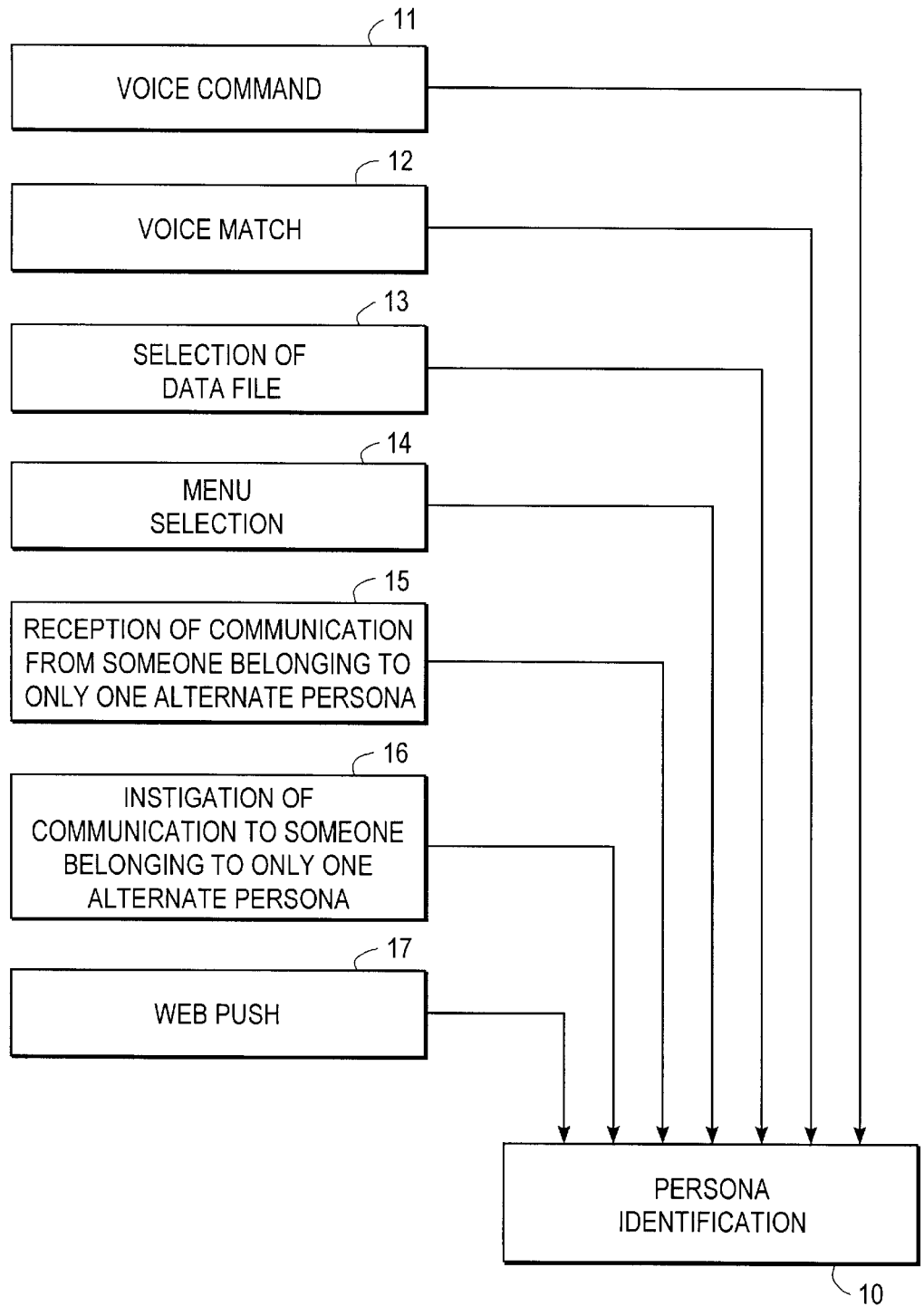
FIG. 4 is a simplified block diagram which shows routes to the identification of a persona in accordance with a preferred embodiment of the present invention.

For example, FIG. 4 lists several events which can be used to make a persona identification 10.

For example, a voice command 11 by the user can be used to identify a persona. A voice match 12 can also be used to identify a persona when voice recognition software is used to recognize the voice of a particular individual. The voice match 12 may be, for example, the voice of the user, or in the alternate, may be a voice of another individual (for example spoken over the phone) who is within a special contact list of individuals for a particular alternate persona.

A data file selection 13 can also be an event which triggers persona identification 10. This happens, for example, when the user selects a data file which is contained within only a single alternate persona.

A menu file selection 14 can also be an event which triggers persona identification 10. For example, the menu can be a persona menu 32, or a separate pop-up or pull-down menu.

A reception of communication 15 can also be used to identify a persona. For example, reception of communication 15 is from another individual who is within a special contact list of individuals for a particular alternate persona.

If communication 15 could be received by more than one alternate persona, the communication can be further analyzed to determine a most appropriate alternate persona to identify.

An instigation of communication 16 can also be used to identify a persona. For example, instigation of communication 16 is to another individual who is within a special contact list of individuals for a particular alternate persona.

A "web push" 17 can also be used to identify a persona. That is, when a web site associated with a particular alternate persona pushes information through the internet to the user, this can identify the particular associated alternate persona who uses this information.

Figure 5:
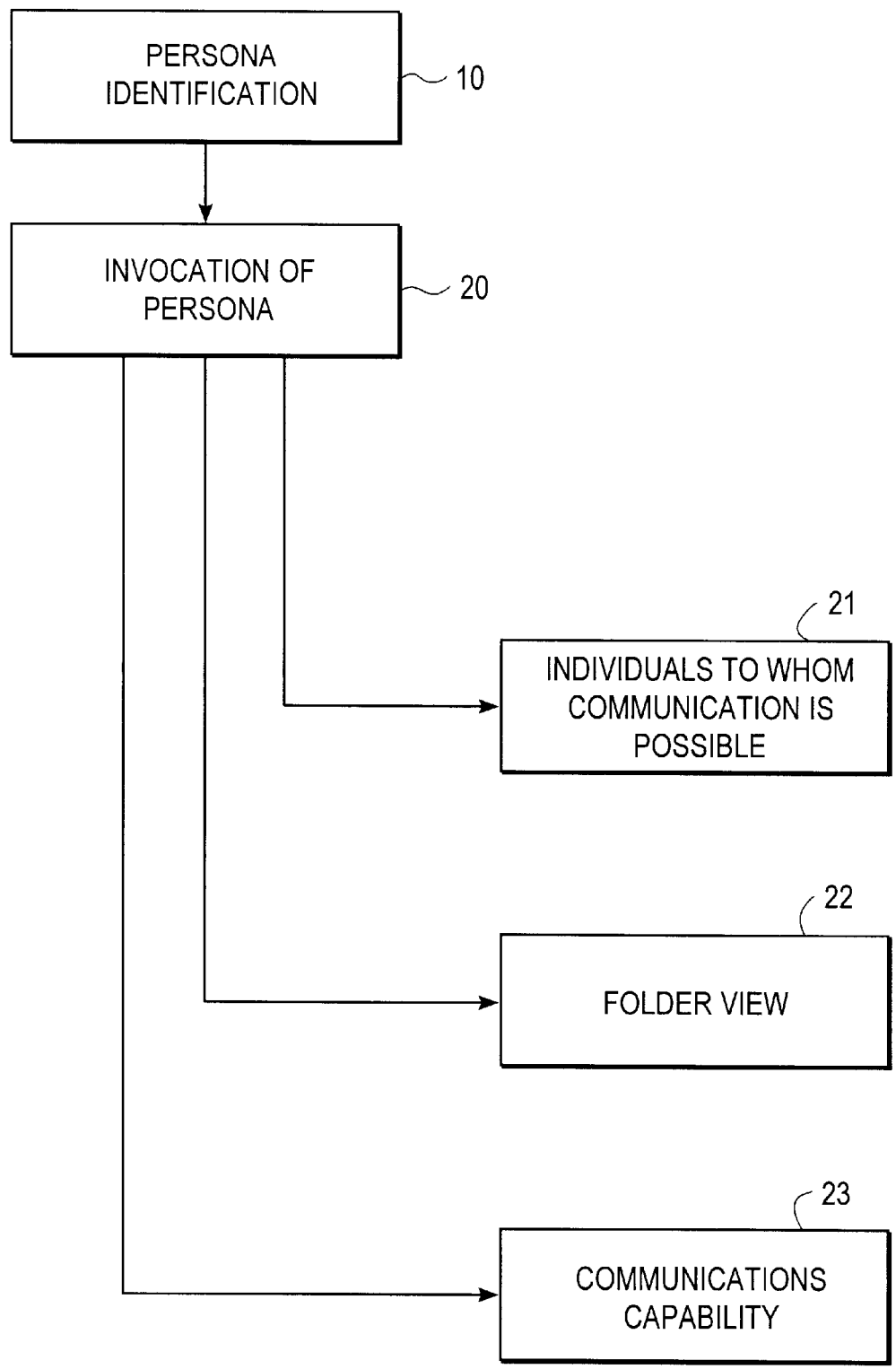
FIG. 5 is a simplified block diagram which illustrates actions taken to implement an interface to a particular persona in accordance with a preferred embodiment of the present invention.

As shown by FIG. 5, once persona identification 10 is triggered, an invocation of persona 20 can occur. Invocation of persona 20 results in three activity areas. A first activity area 21 is to identify individuals with whom communication is possible. These are displayed, for example, in an information directory for the alternate persona, as described above. A second activity area 22 is to create a file view of the alternate persona. This is done, for example, by displaying for the alternate persona, files which the alternate persona is permitted to access, as further described above. In addition, files and/or contacts pertaining particularly to the individual or communication which triggered invocation of the alternate persona also can be opened or otherwise made available to the user. A third activity area 23 is to provide communications capability for the alternate persona. This is done, for example, by limiting communications capabilities to only those for which the alternate persona is authorized, as further described above.

While FIG. 4 lists several events which can be used to trigger invocation of a persona (whether the master persona or an alternate persona), the events that actually trigger the invocation of a persona is user configurable in a preferred embodiment. That is, for example, a user operating in one alternate persona can elect to ignore communications from individuals who are not within a list of contacts for the alternate persona. Alternatively, the user operating in one alternate persona can elect to receive messages from individuals who are not within a list of contacts for the alternate persona. Alternatively, when a user receives a message from an individual who is not within a list of contacts for the current alternate persona, the user can allow that event to trigger the PMCS to automatically switch to an alternate persona that is able to respond to the message. If no alternate persona is able to respond to the message, the event can trigger the PMCS to automatically switch to the master persona.

In one preferred embodiment of the present invention, PMCS keeps track of the amount of time spent within each alternate persona and within the master persona. This simplifies, for example, the task of billing for work performed.

What is claimed is:

1. A computing system comprising:

master persona mode means for allowing navigation to reach all information stored in data files in the computer system when the computing system is in a master persona mode; and, first alternate persona mode means for restricting navigation so that only a first proper subset of the information can be reached when in a first alternate persona mode;

wherein said information includes a list of contacts and a range of communication capabilities, and the first alternate persona mode includes a data structure, the data structure including:

first identification of a first proper subset of the list of contacts;

second identification of a first proper subset of the set of data files; and, third identification of a first proper subset of the range of communication capabilities.

2. A computing system as in claim 1 wherein:

the master persona mode means provides user access to a full range of communication capabilities when the computing system is in the master persona mode; and, the first alternate persona mode means provides user access to only a first proper subset of the full range of communication capabilities when the computing system is in the first alternate persona mode.

3. A computing system as in claim 1 additionally comprising:

second alternate persona mode means for restricting navigation so that only a second proper subset of the full set of information can be reached when in a second alternate persona mode.

4. A computing system comprising:

master persona mode means for allowing navigation to reach all information stored in data files in the computer system when the computing system is in a master persona mode; and, first alternate persona mode means for restricting navigation so that only a first proper subset of the information can be reached when in a first alternate persona mode;

wherein said information includes a list of contacts and a set of data files and the first alternate persona mode includes a data structure, the data structure including:

first identification of the first subset of the full list of contacts; and, second identification of the first subset of the full set of data files.

5. A computing system as in claim 4 wherein:

the master persona mode means provides user access to a full range of communication capabilities when the computing system is in the master persona mode; and, the first alternate persona mode means provides user access to only a first proper subset of the full range of communication capabilities when the computing system is in the first alternate persona mode.

6. A computing system as in claim 4 additionally comprising:

second alternate persona mode means for restricting navigation so that only a second proper subset of the full set of information can be reached when in a second alternate persona mode.

* * * * *